(12) United States Patent
Nakakomi et al.

(10) Patent No.: US 9,703,107 B2
(45) Date of Patent: Jul. 11, 2017

(54) LIQUID CRYSTAL DISPLAY DEVICE AND THREE-DIMENSIONAL DISPLAY DEVICE

(71) Applicant: Japan Display Inc., Tokyo (JP)

(72) Inventors: Masaru Nakakomi, Tokyo (JP); Hiroaki Komatsu, Tokyo (JP); Yuji Maede, Tokyo (JP); Hirotaka Imayama, Tokyo (JP)

(73) Assignee: Japan Display Inc., Tokyo (JP)

( * ) Notice: Subject to any disclaimer, the term of this patent is extended or adjusted under 35 U.S.C. 154(b) by 134 days.

(21) Appl. No.: 14/551,120

(22) Filed: Nov. 24, 2014

(65) Prior Publication Data

US 2015/0146119 A1 May 28, 2015

(30) Foreign Application Priority Data

Nov. 25, 2013 (JP) .................................. 2013-243232

(51) Int. Cl.
*G02F 1/1337* (2006.01)
*G02B 27/22* (2006.01)
(Continued)

(52) U.S. Cl.
CPC ... *G02B 27/2214* (2013.01); *G02F 1/133707* (2013.01); *G02F 1/134309* (2013.01);
(Continued)

(58) Field of Classification Search
CPC ............ H04N 13/0409; G02B 27/2214; G02F 1/134309; G02F 1/133707; G02F 2001/134372
See application file for complete search history.

(56) References Cited

U.S. PATENT DOCUMENTS

| 2001/0022569 A1* | 9/2001 | Ohta ................. G02F 1/134363 345/88 |
| 2007/0146259 A1* | 6/2007 | Jin ...................... G02F 1/13471 345/87 |

(Continued)

FOREIGN PATENT DOCUMENTS

| JP | 03-119889 A | 5/1991 |
| JP | 2002-122876 A | 4/2002 |

*Primary Examiner* — Paul Lee
*Assistant Examiner* — Jia Pan
(74) *Attorney, Agent, or Firm* — Typha IP LLC

(57) ABSTRACT

A three-dimensional display device of a parallax barrier system including a liquid crystal display device of an IPS system having a TFT substrate and an opposed substrate as well as a liquid crystal barrier panel of a TN system having a first substrate and a second substrate, in which the opposed substrate of the liquid crystal display device and the second substrate of the liquid crystal barrier panel are opposedly arranged by interposing a polarizer, the TFT substrate includes a pixel configured by a common electrode having a slit above a pixel electrode configured in a planar shape, and includes a first pixel in which an angle made by an alignment axis of the TFT substrate and a direction of a long axis of the slit is θ1 and a second pixel in which an angle made by the alignment axis of the TFT substrate and the direction of the long axis of the slit is θ2, θ1 and θ2 are in a relationship θ1=−θ2, the first pixel and the second pixel are arranged to switch in a first direction, and arranged to switch in a second direction, and the alignment axis of the TFT substrate and an alignment axis of the second substrate of the liquid crystal barrier panel coincide with each other or are orthogonal to each other.

12 Claims, 20 Drawing Sheets

A

B

(51) Int. Cl.
*H04N 13/04* (2006.01)
*G02F 1/1343* (2006.01)
(52) U.S. Cl.
CPC ........... *G02F 2001/134372* (2013.01); *H04N 13/0409* (2013.01)

(56) References Cited

U.S. PATENT DOCUMENTS

| | | | | |
|---|---|---|---|---|
| 2010/0195027 | A1* | 8/2010 | Yoshida | G02F 1/133707 349/106 |
| 2010/0309296 | A1* | 12/2010 | Harrold | H04N 13/0404 348/54 |
| 2012/0229429 | A1* | 9/2012 | Inoue | G02B 27/2214 345/204 |

* cited by examiner

A

FIG. 8
| θ3 | COMPARISON VALUE |
|---|---|
| 72° | 105.3% |
| 78° | 101.3% |
| 82° | 100.0% |
| 90° | 97.8% |
FIG. 9A
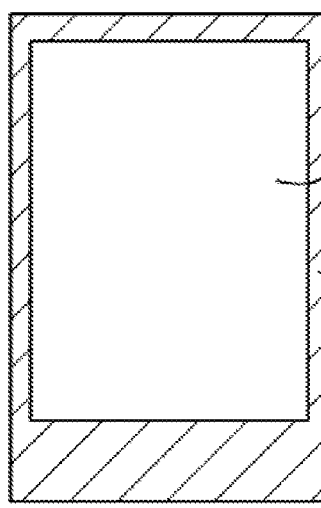
FIG. 9B
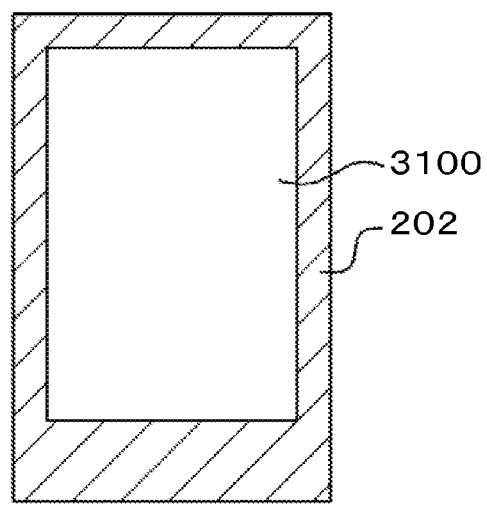

LIQUID CRYSTAL DISPLAY DEVICE AND THREE-DIMENSIONAL DISPLAY DEVICE

CLAIM OF PRIORITY

The present application claims priority from Japanese Patent Application JP 2013-243232 filed on Nov. 25, 2013, the content of which is hereby incorporated by reference into this application.

FIELD OF THE INVENTION

The present invention relates to a display device, particularly relates to a three-dimensional image display device using a parallax barrier panel by a liquid crystal enlarging a viewing angle in a horizontal direction.

BACKGROUND OF THE INVENTION

A parallax barrier system is known as a method of displaying a three-dimensional image without using a pair of spectacles. The parallax barrier system is a method of installing an image in which an image of a visual field from the right eye and an image of a visual field from the left eye are cut vertically in a strip-like shape and alternately aligned rearward from a plate including plural slender slits in a vertical direction which is referred to as a parallax barrier panel, and displaying the image as a three-dimensional image via the parallax barrier.

Japanese Unexamined Patent Application Publication No. Hei 3(1991)-119889 describes a configuration of a three-dimensional image display device enabling to display both of a two-dimensional image and a three-dimensional image by configuring a parallax barrier panel by using a liquid crystal.

Japanese Unexamined Patent Application Publication No. 2002-122876 describes a liquid crystal display device by an IPS (In Plane Switching) system in which a viewing angle property is made uniform by using a first pixel and a second pixel having different extending directions of a pixel electrode and a common electrode. According to Japanese Unexamined Patent Application Publication No. 2002-122876, the extending directions of the pixel electrode and the common electrode differ from a screen vertical direction or a screen horizontal direction, and therefore, a shape of the pixel is made to be not a rectangle but a parallelogram.

SUMMARY OF THE INVENTION

There is a three-dimensional image display system which uses an exclusive pair of spectacles. There is also a three-dimensional image display system which does not use the exclusive pair of spectacles. According to the parallax barrier system, an image displayed on a display device is spatially divided into that for the left eye and that for the right eye to thereby display a three-dimensional image by utilizing a barrier pattern configured at the parallax barrier panel, and the exclusive pair of spectacles is not needed.

The parallax barrier panel using the liquid crystal has an advantage of capable of easily switching the two-dimensional image and the three-dimensional image as needed. That is, an image can be displayed three-dimensionally when the barrier pattern is configured by applying a barrier signal to the parallax barrier panel, and the image can be displayed two-dimensionally in a case where the barrier signal is not applied to the parallax barrier panel.

FIG. 20 is a sectional view showing a principle of displaying a three-dimensional image according to the parallax barrier system. The right eye RE recognizes only a pixel R for the right eye configured at a display device 800, and the left eye LE recognizes only a pixel L for the left eye by a barrier area 610 and an opening area 620 configured at a barrier pattern 600. Thereby, a human being can recognize a three-dimensional image.

FIG. 21 is a schematic sectional view of a three-dimensional image device according to the present invention. A device shown in FIG. 21 is constructed by a configuration in which an image configured by a liquid crystal display panel 3000 is made to be visible as a three-dimensional image by using a liquid crystal parallax barrier panel 1000. The liquid crystal parallax barrier panel (hereinafter, referred to as parallax barrier panel) 1000 and the liquid crystal display panel 3000 are adhered by a transparent adhering member 2000. The liquid crystal display panel per se does not emit light, and therefore, a backlight 4000 is arranged at a back face of the liquid crystal display panel 3000.

A liquid crystal display device poses a problem of a viewing angle property. An IPS system liquid crystal display device has an excellent viewing angle property since transmission of a pixel is controlled by rotating in a direction in parallel with a main face of a liquid crystal molecule substrate. Although there are various kinds of IPS systems, FIG. 22 shows a sectional view of an IPS system liquid crystal display panel which is currently used widely. According to the system, in short, a common electrode 110 having a slit is arranged above a pixel electrode 112 configured in a planar shape via an interlayer insulating film 111. Further, when a voltage is applied between the pixel electrode 112 and the common electrode 110, an electric line of force is extended from the common electrode 110 to a side of the pixel electrode 112 via a liquid crystal layer, and an image is configured by controlling a transmissivity for each pixel by rotating a liquid crystal molecule 301 by the electric line of force.

In FIG. 22, a first substrate film 101 comprising SiN and a second substrate film 102 comprising $SiO_2$ are configured above a glass substrate 100 by CVD (Chemical Vapor Deposition). A role of the first substrate film 101 and the second substrate film 102 resides in preventing impurities from the glass substrate 100 from contaminating a semiconductor layer 103.

The semiconductor layer 103 is configured on the second substrate film 102. According to the semiconductor layer 103, an a-Si film is configured on the second substrate film 102 by CVD, and the a-Si film is converted into a poly-Si film by subjecting the a-Si film to laser annealing. The poly-Si film is patterned by photolithography.

A gate insulator film 104 is configured on the semiconductor film 103. The gate insulator film 104 is an $SiO_2$ film by TEOS (tetraethoxysilane). The film is also configured by CVD. A gate electrode 105 is configured thereon. The gate electrode 105 is in a layer the same as a layer of a scanning signal line, and is configured simultaneously therewith. The gate electrode 105 is configured by, for example, an MoW film. When it is necessary to reduce a resistance of the gate wiring 105, an Al alloy is used.

An interlayer insulator film 106 is configured by $SiO_2$ by covering the gate electrode 105 or the gate wiring. The first interlayer insulator film 106 is for insulating the gate wiring 105 from a source electrode 107. The first interlayer insulator film 106 and the gate insulator film 104 are configured with a through hole for connecting a source portion S of the semiconductor layer 103 to the source electrode 107. The source electrode 107 is configured on the first interlayer insulator film 106. The source electrode 107 is connected to a pixel electrode 112 via a through hole. In FIG. 22, the source electrode 107 is configured widely in a shape of covering a TFT. On the other hand, a drain D of the TFT is connected to a drain electrode at a portion, not illustrated.

The source electrode 107, the drain electrode and an image signal line are configured simultaneously in the same layer. The source electrode 107, the drain electrode and the image signal line (hereinafter, represented by the source electrode 107) use, for example, an AlSi alloy to reduce the resistance. The AlSi alloy generates a hillock, or Al thereof diffuses to other layer, and therefore, for example, there is adopted a structure of sandwiching AlSi by a barrier layer, and a cap layer by MoW, not illustrated.

An inorganic passivation film (insulator film) 108 is coated to cover the source electrode 107 to protect a total of the TFT. The inorganic passivation film 108 is configured by CVD similar to the first substrate film 101. An organic passivation film 109 is configured to cover the inorganic passivation film 108. The organic passivation film 109 is configured by a photosensitive acrylic resin. The organic passivation film 109 can also be configured by silicone resin, epoxy resin, polyimide resin or the like other than the acrylic resin. The organic passivation film 109 has a role as a flattening film, and therefore, is formed thickly. Although a film thickness of the organic passivation film 109 is 1 through 4 μm, in many cases, is about 2 μm.

A through hole 130 is configured at the inorganic passivation film 108 and the organic passivation film 109 to make the pixel electrode 112 and the source electrode 107 conductive to each other. The through hole is configured at the inorganic passivation film 108 by etching with the organic passivation film 109 as a resist. Thus, the through hole 130 is configured for making the source electrode 107 and the pixel electrode 112 conductive to each other.

An upper face of the organic passivation film 109 configured in this way is made to be flat. Amorphous ITO (Indium Tin Oxide) is coated on the organic passivation film 109 by sputtering, patterned by a photoresist, thereafter, etched by oxalic acid to thereby pattern the pixel electrode 112. The pixel electrode 112 is configured to cover the through hole 130. The pixel electrode 112 is configured by ITO which is a transparent electrode, and a thickness thereof is, for example, 50 through 70 μm.

Thereafter, a second interlayer insulator film 111 is configured to cover the pixel electrode 112 by CVD. A temperature condition of CVD at this occasion is about 200° C., and this is referred to as low temperature CVD. The low temperature CVD is used for preventing deterioration in the organic passivation film 109 already configured.

The amorphous ITO is sputtered on the second interlayer insulator film 111 to thereby configure the common electrode 110 by covering an entire region of a display area. The common electrode 110 is configured with a slit in a pixel area. An alignment film 113 is configured to cover the common electrode. When an image signal is supplied to the pixel electrode 112, an electric line of force is extended from the common electrode 110 to the pixel electrode 112 via a liquid crystal layer 300, a liquid crystal molecule 301 is rotated by an electric field component in a transverse direction of the electric line of force, and a quantity of light transmitting the liquid crystal layer 300 is controlled.

In FIG. 22, an opposed substrate 200 is arranged by interposing the liquid crystal layer 300. A color filter 201 is configured on an inner side of the opposed substrate 200. The color filter 201 is configured with color filters of red, green, and blue for each pixel, and a color image is configured. A black matrix 202 is configured between the color filter 201 and the color filter 201, and a contrast of an image is improved. An overcoating film 203 is configured to cover the color filter 201 and the black matrix 202. An alignment film 113 is configured to cover the overcoating film.

As shown in FIG. 22, according to the IPS system, a conductive film is not configured on an inner side of the opposed substrate 200. Then, a potential of the opposed substrate 200 becomes unstable. Also, an electromagnetic noise from outside invades the liquid crystal layer 300 to effect an influence on the image. An outer conductive film 210 is configured on an outer side of the opposed substrate 200 in order to remove such a problem. The outer conductive film 210 is configured by sputtering ITO which is a transparent conductive film.

In FIG. 22, the alignment film 113 determines a direction of an initial alignment of the liquid crystal molecule 301. According to the IPS system, directions of alignment axes stay the same in the alignment film 113 on the side of the TFT substrate 100 and the alignment film 113 on the side of the opposed substrate 200. Incidentally, there is a case where the alignment film is subjected to an alignment treatment by rubbing, and there is also a case where the alignment film is subjected to an alignment treatment by so-called light alignment.

Although FIG. 22 shows a so-called top gate system in which poly-Si is used in the semiconductor layer 103, and the gate electrode 105 is arranged above the semiconductor layer 103, the present invention can be applied without a problem also to a so-called bottom gate system in which the gate electrode 105 is arranged below the semiconductor layer 103. Further, there may be a case where the semiconductor layer 103 is configured by poly-Si or a case where the semiconductor layer 103 is configured by a-Si.

FIG. 23 is a sectional view showing the liquid crystal barrier panel 1000. A liquid crystal panel of a TN system is used for the liquid crystal barrier panel 1000. The liquid crystal barrier panel is constructed by a configuration in which a liquid crystal layer is interposed between a first substrate 10 having a barrier electrode 15 and a second substrate 20 having an opposed electrode 21. In FIG. 23, the opposed electrode 21 is configured over an entire face of the second substrate 20, and the first substrate 10 is configured with the barrier electrode 15 extended in a direction vertical to a paper face, that is, in a y axis direction of the drawing. When a voltage is applied to the barrier electrode 15 (ON), in a case where transmission axes of upper and lower polarizers are orthogonal to each other, the liquid crystal molecule 301 rises, and light is not transmitted by losing an optical rotary power. Therefore, a barrier area through which light is not transmitted is configured.

The barrier electrode is configured by a prescribed pitch, ordinarily, twice as much as a pixel pitch of the liquid crystal display panel, and therefore, a barrier area in a stripe-like shape is configured by the prescribed pitch. In FIG. 23, although the electrode 15 in an OFF state is present, a transmitting area is configured at the portion. The barrier area can be changed by changing an electrode which is made to be ON.

FIG. 24 is a perspective view showing polarization axes of polarizers and alignment axes of the first substrate 10 and the second substrate 20 of the liquid crystal barrier panel of a three-dimensional image device in a case where the liquid crystal barrier panel and the IPS liquid crystal display panel are used. In FIG. 24, a first polarizer 30 pasted to a lower side of a TFT substrate and a second polarizer 40 pasted to an upper side of an opposed substrate of the IPS liquid crystal display panel, the second substrate 20, and the first substrate 10 of the liquid crystal barrier panel, and a third polarizer 50 pasted thereabove are arranged on an upper side of the backlight 4000.

In FIG. 24, a transmission axis 31 of the first polarizer 30 is in an x axis direction. In this case, when the IPS system liquid crystal panel is in a so-called e-mode, an alignment axis of the TFT substrate is in a y axis direction. Further, also an alignment axis of the opposed substrate of the liquid crystal display panel is in the y axis direction, and also a transmission axis 41 of the second polarizer 40 is in the y direction. Further, also the alignment axis 21 of the second substrate 20 of the barrier panel is in the y direction. The barrier panel is a TN type liquid crystal panel, and therefore, the alignment axis 11 of the first substrate 10 is in an x direction, and also a transmission axis 51 of the third polarizer 50 is in the x direction. Incidentally, positions of arranging the first substrate and the second substrate may be inverted by inverting the liquid crystal barrier panel.

A viewing angle property of the TN liquid crystal panel is the largest in a 45 degree direction from a direction of the alignment axis. FIG. 25 shows the behavior. FIG. 25 shows a contour of a contrast of the TN liquid crystal display panel, and shows the viewing angle property. As shown in FIG. 25, in a case where the alignment axis is in the x axis direction, the contrast is the largest in the direction of 45 degrees from the x axis direction.

In the three-dimensional image display device of the parallax barrier system, it is said as crosstalk that a pixel for the left eye and a pixel for the right eye cannot completely be separated. A viewing angle property in a horizontal direction effects an influence the most on the crosstalk. Even when the viewing angle property is improved by using IPS in the liquid crystal display panel, so far as the viewing angle property in the horizontal direction of the barrier panel using the TN liquid crystal is poor, the crosstalk is not improved for the entire three-dimensional image display device.

FIG. 26 shows directions of alignment axes of the first through the third polarizers and the first substrate 10 and the second substrate 20 of the liquid crystal barrier panel according to the present invention improving the crosstalk. What FIG. 26 considerably differs from FIG. 24 is that directions of transmission axes of the first polarizer 30 and the second polarizer 40 are in directions deviated from the x direction by 45 degrees. In this case, also alignment axes of the TFT substrate and the opposed substrate of the liquid crystal display panel of the IPS system which are arranged to be interposed by the first polarizer 30 and the second polarizer 40 are in directions deviated from the x direction by 45 degrees.

Therefore, in the configuration of FIG. 26, the second substrate 20 of the liquid crystal barrier panel is in a direction the same as the direction of the transmission axis 41 of the second polarizer 40, and the alignment axis 11 of the first substrate 10 is in a direction deviated from the alignment axis 21 of the second substrate by 90 degrees. Further, the transmission axis 51 of the third polarizers 51 is in a direction the same as the direction of the alignment axis 11 of the first substrate 10. What is important in FIG. 26 is that the alignment axis 11 of the first substrate 10 of the liquid crystal barrier panel is in a direction deviated from the x direction, that is, the horizontal direction by 45 degrees.

A direction in which the viewing angle property of the TN liquid crystal panel is the largest is in a direction deviated from the direction of the alignment axis by 45 degrees. Therefore, as shown in FIG. 27, the viewing angle property in the horizontal direction can be improved. In FIG. 27, notation CR 100 designates an area where a contrast is the largest, notation CR 50 designates an area where the contrast is reduced to 50% of CR 100, and notation CR 10 designates an area where the contrast is reduced to 10% of CR 100.

In this way, the viewing angle property in the horizontal direction (x axis direction) can be improved by constructing the configuration of FIG. 26, and therefore, the crosstalk of the three-dimensional image display device of the parallax barrier system can be improved, and an area which can make the three-dimensional image of the three-dimensional image display device visible can be widened. However, in the background art, it is necessary in the liquid crystal display device of the IPS system that the directions of the alignment axes of the TFT substrate and the opposed substrate are in the x axis direction (horizontal direction) or the y axis direction (vertical direction) or within ±10 of the x axis direction, or within ±10 of the y axis direction owing to the structure of the pixel electrode or the common electrode. Incidentally, a gate wiring (scanning signal line) is extended in the x axis direction or the y axis direction.

It is a problem of the present invention to realize a liquid crystal display device having a pixel structure which can direct directions of the alignment axes of the TFT substrate and the opposed substrate in a direction deviated from the x axis direction by 45 degrees in the liquid crystal display device of the IPS system.

It is other problem of the present invention to prevent an occurrence of nonuniformity in display in a case where two pixel structures are used for improving a uniformity of a viewing angle property in a liquid crystal display device of the IPS system.

The present invention resolves the problem described above and the specific means is as follows.

(1) A liquid crystal display device, featured in a liquid crystal display device interposing a liquid crystal between a TFT substrate configured by a pixel configured with a common electrode having a slit above a pixel electrode configured in a planar shape and an opposed substrate having a black matrix, in which the pixel is configured in a rectangular shape or a square shape, and configured between a scanning line extended in a first direction and aligned in a second direction and an image signal line extended in the second direction and aligned in the first direction, the TFT substrate includes a first pixel in which an angle made by an alignment axis of the TFT substrate and a direction of a long axis of the slit is θ1 and a second pixel in which an angle made by the alignment axis of the TFT substrate and the direction of the long axis of the slit is θ2, and the θ1 and the θ2 are in a relationship of θ1=−θ2, the first pixel and the second pixel are arranged to switch in the first direction, and arranged to switch in the second direction.

(2) The liquid crystal display device described in (1), featured in that the first pixel and the second pixel are arranged in the first direction to switch at every two pixels and arranged in the second direction to switch at every one pixel.

(3) The liquid crystal display device described in (1), featured in that the first pixel and the second pixel are arranged in the first direction to switch at every one pixel, and arranged in the second direction to switch at every two pixels.

(4) The liquid crystal display device described in (1), featured in that the first pixel and the second pixel are arranged to switch in the first direction in a first row, and arranged to switch in the second direction in a second row, and the first pixel in the first row and the first pixel in the second row are arranged in the first direction to shift by a half of a diameter in the first direction of the pixel.

(5) The liquid crystal display device described in (4), featured in that when a direction of extending the scanning line is defined as an x direction, the first row and the second row and a third row are consecutively arranged, in the first row through the third row, the first pixel and the second pixel are arranged to switch in the first direction, the first pixel in the second row is arranged to shift from the first pixel in the first row in a +x direction by a half of a diameter in the first direction of the pixel, and the first pixel in the third row is arranged to shift from the first pixel in the second row in the +x direction by the half of the diameter in the first direction of the pixel.

(6) The liquid crystal display device described in (4), featured in that when a direction of extending the scanning line is defined as an x direction, the first row and the second row and the third row are consecutively arranged, in the first row through the third row, the first pixel and the second pixel are arranged to switch in the first direction, the first pixel in the second row is arranged to shift from the first pixel of the first row in a −x direction by a half of a diameter in the first direction of the pixel, and the first pixel of the third row is arranged to shift from the first pixel of the second row in the −x direction by the half of the diameter in the first direction of the pixel.

(7) The liquid crystal display device described in any one of (1) through (6), featured in that a length of the slit of the first pixel differs from a length of the slit of the second pixel.

(8) The liquid crystal display device described in any one of (1) through (6), featured in that a width of the slit of the first pixel differs from a width of the slit of the second pixel.

(9) The liquid crystal display device described in any one of (1) through (6), featured in that an angle made by a direction of a short side of the slit of the first pixel and the alignment axis is equal to an angle made by a direction of a short side of the slit of the second pixel and the alignment axis.

(10) The liquid crystal display device described in any one of (1) through (6), featured in that an aperture area of the black matrix of the opposed substrate in correspondence with the first pixel differs from an aperture of the black matrix of the opposed substrate in correspondence with the second pixel.

(11) A three-dimensional display device, featured in a three-dimensional display device of a parallax barrier system including a liquid crystal display device of an IPS system having a TFT substrate and an opposed substrate and a liquid crystal barrier panel of a TN system having a first substrate and a second substrate, in which the opposed substrate of the liquid crystal display device and the second substrate of the liquid crystal barrier panel are opposedly arranged by interposing a polarizer, the liquid crystal display device is a liquid crystal display device interposing a liquid crystal between the TFT substrate including a pixel configured with a common electrode having a slit above a pixel electrode configured in a planar shape and the opposed substrate having a black matrix, in which the pixel is configured between a scanning line extended in a first direction and aligned in a second direction and an image signal line extended in the second direction and aligned in the first direction, the slit includes a first slit in which an angle made by an alignment axis of the TFT substrate and a direction of a long axis of the slit is θ1, a second slit in which an angle made by the alignment axis of the TFT substrate and the direction of the long axis of the slit is θ2, and a bent portion, the θ1 and the θ2 are in a relationship of θ1=−θ2, a direction of the alignment axis of the TFT substrate is 45 degrees, and a direction of the alignment axis of the second substrate of the liquid crystal barrier panel is 45 degrees.

(12) The three-dimensional display device described in (11), featured in that the first substrate is configured with an electrode in a stripe-like shape configuring a parallax barrier pattern.

(13) A three-dimensional display device, featured in a three-dimensional display device of a parallax barrier system including a liquid crystal display device of an IPS system having a TFT substrate and an opposed substrate and a liquid crystal barrier panel of a TN system having a first substrate and a second substrate, in which the opposed substrate of the liquid crystal display device and the second substrate of the liquid crystal barrier panel are opposedly arranged by interposing a polarizer, the liquid crystal display device is a liquid crystal display device interposing a liquid crystal between the TFT substrate including a pixel electrode configured by a common electrode having a slit above a pixel electrode configured in a planar shape and the opposed substrate having a black matrix, the pixel is configured by a rectangular shape or a square shape and configured between a scanning line extended in a first direction and aligned in a second direction and an image signal line extended in the second direction and aligned in the first direction, the TFT substrate includes a first pixel in which an angle made by an alignment axis of the TFT substrate and a direction of a long axis of the slit is θ1 and a second pixel in which an angle made by the alignment axis of the TFT substrate and the direction of the long axis of the slit is θ2, the θ1 and the θ2 are in a relationship of θ1=−θ2, the first pixel and the second pixel are arranged to switch in the first direction, and arranged to switch in the second direction, and the alignment axis of the TFT substrate and the alignment axis of the second substrate of the liquid crystal barrier panel coincide with each other or are orthogonal to each other.

(14) The three-dimensional display device described in (13), featured in that the first pixel and the second pixel are arranged in the first direction to switch at every two pixels, and arranged in the second direction to switch at every one pixel, and the alignment axis of the TFT substrate and the alignment axis of the second substrate coincide with each other.

(15) The three-dimensional display device described in (13), featured in that the first pixel and the second pixel are arranged in the first direction to switch at every one pixel, and arranged in the second direction to switch at every two pixels, and the alignment axis of the TFT substrate and the alignment axis of the second substrate of the liquid crystal barrier panel coincide with each other.

(16) The three-dimensional display device described in (13), featured in that the first pixel and the second pixel are arranged to switch in the first direction in a first row, and arranged to switch in the second direction in a second row, the first pixel of the first row and the second pixel of the second row are arranged in the first direction to shift by a half of a diameter in the first direction of the pixel, and the alignment axis of the TFT substrate and the alignment axis of the second substrate of the barrier panel coincide with each other.

(17) The three-dimensional display device described in any one of (13) through (16), featured in that the alignment axis of the TFT substrate is deviated from a direction of the scanning line by 45 degrees.

(18) The three-dimensional display device described in any one of (13) through (17), featured in that a length of the slit of the first pixel differs from a length of the slit of the second pixel.

(19) The three-dimensional display device described in any one of (13) through (17), featured in that a width of the slit of the first pixel differs from a width of the slit of the second pixel.

(20) The three-dimensional display device described in any one of (13) through (17), featured in that an angle made by a direction of a short side of the slit of the first pixel and the alignment axis is equal to an angle made by a direction of a short side of the slit of the second pixel and the alignment axis.

(21) The three-dimensional display described in any one of (13) through (17), featured in that an aperture area of the black matrix of the opposed substrate in correspondence with the first pixel differs from an aperture area of the black matrix of the opposed substrate in correspondence with the second pixel.

According to the present invention, in the three-dimensional image device of the parallax barrier system, a viewing angle property in a horizontal direction of the liquid crystal barrier panel can be improved, and therefore, crosstalk can be restrained, and a range in which a three-dimensional image is made to be visible can be enlarged. Also, according to the present invention, in the liquid crystal display device of the IPS system, a uniformity of the viewing angle property can be improved by combining two kinds of pixels while restraining nonuniformity in display.

BRIEF DESCRIPTION OF THE DRAWINGS

FIG. 8 is a table showing a relationship between a shape of a short side of a slit and a transmissivity;

FIGS. 9A and 9B show examples of cases of different black matrix aperture areas;

FIG. 10 shows an example of a pixel arrangement of a conventional example;

FIG. 11 shows a first example of a pixel arrangement according to the present invention;

FIG. 12 shows a second example of a pixel arrangement according to the present invention;

FIG. 13 shows a third example of a pixel arrangement according to the present invention;

FIG. 14 shows an example of a delta arrangement according to a conventional example;

FIG. 15 shows a fourth example of a pixel arrangement according to the present invention;

FIG. 16 shows a sixth example of a pixel arrangement according to the present invention;

FIG. 17 shows a sixth example of a pixel arrangement according to the present invention;

DETAILED DESCRIPTION OF THE PREFERRED EMBODIMENTS

A detailed description will be given of the present invention by using embodiments as follows.

First Embodiment

Figure 1:
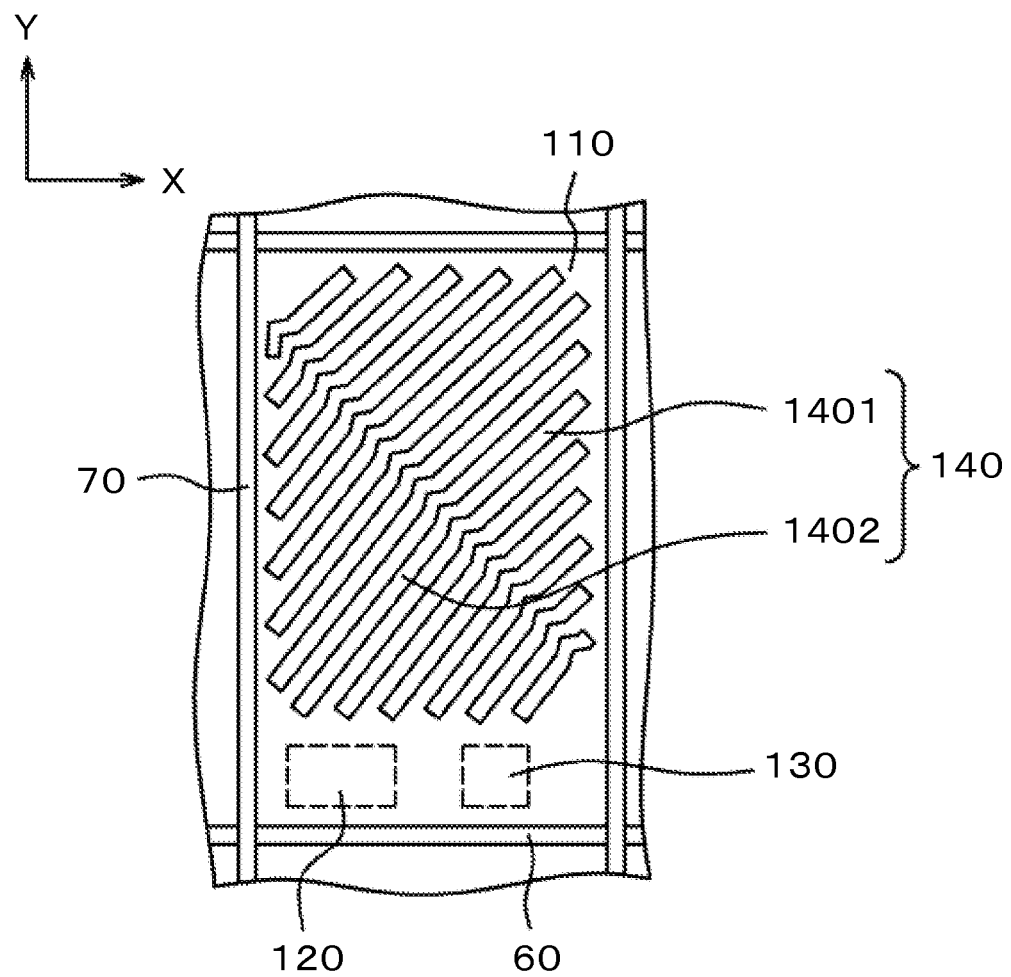
FIG. 1 is a plane view of a pixel of a liquid crystal display panel according to a first embodiment.
Figure 22:
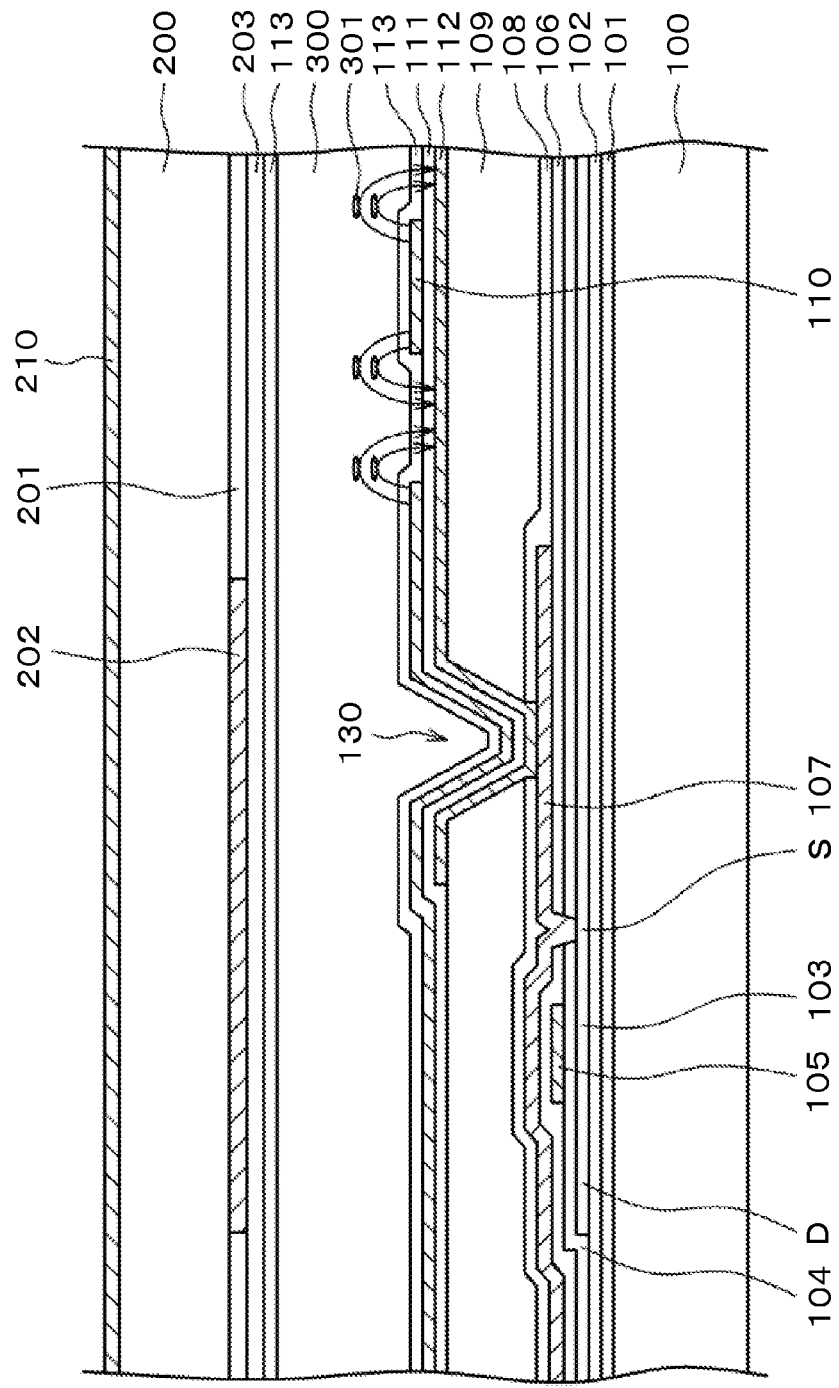
FIG. 22 is a sectional view of a liquid crystal display panel of an IPS system.
Figure 23:
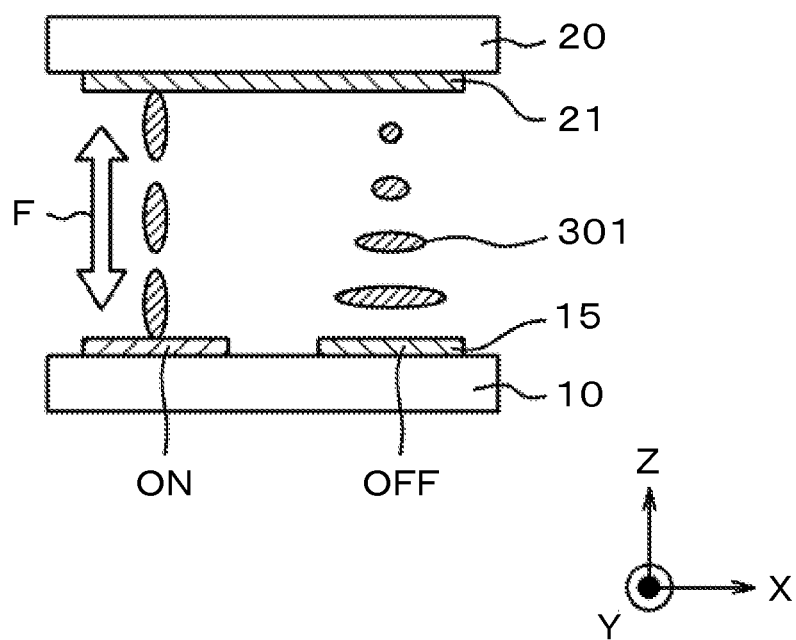
FIG. 23 is a sectional view showing an operation of a liquid crystal barrier panel.
Figure 24:
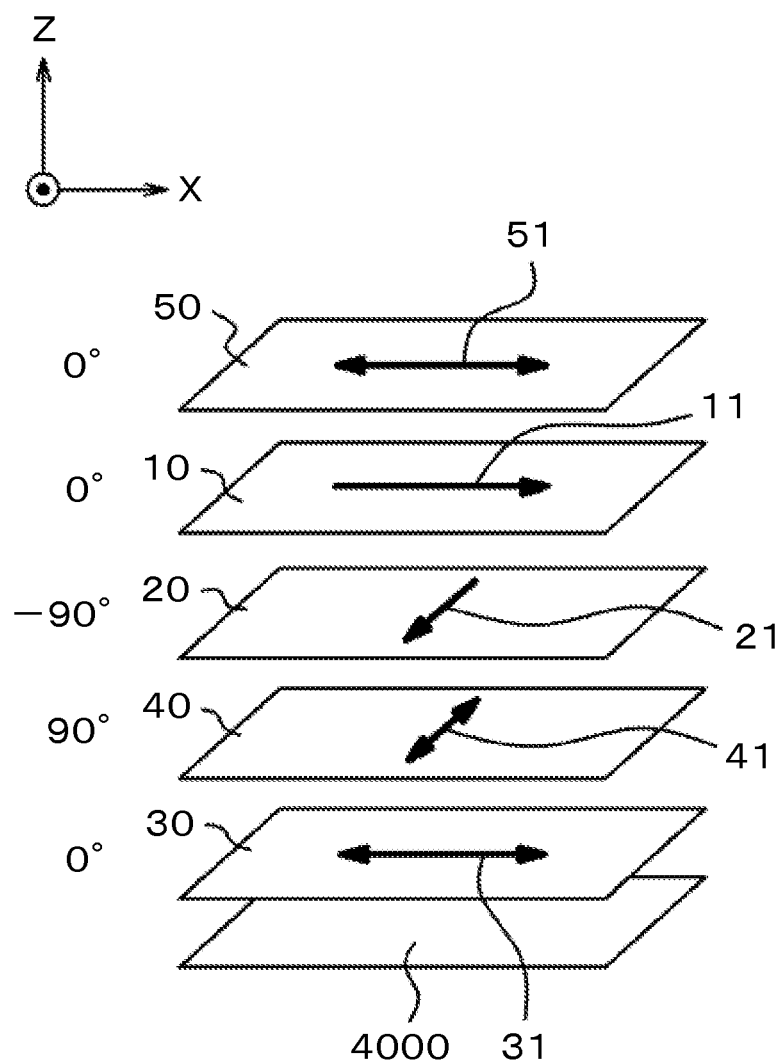
FIG. 24 is a perspective view showing a relationship between an alignment axis of a liquid crystal and a transmission axis of a polarizer in a three-dimensional display device of a parallax barrier system of a conventional example.
Figure 25:
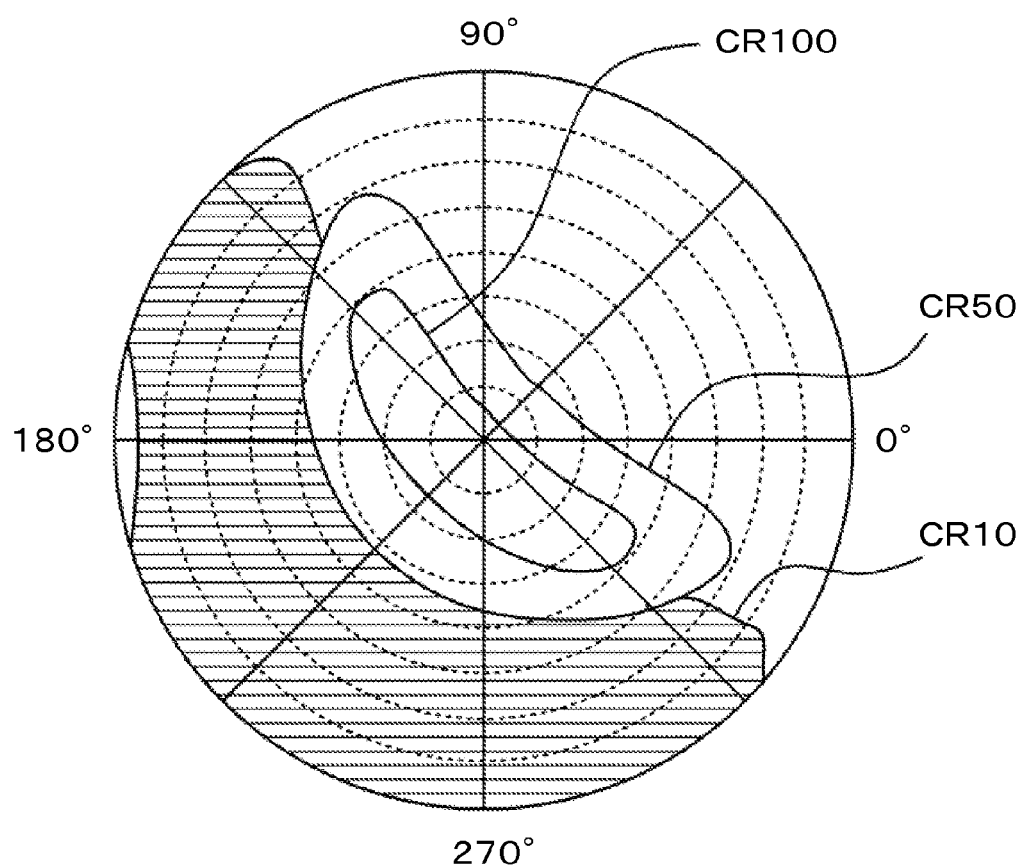
FIG. 25 shows a viewing angle property of the three-dimensional display device of the parallax barrier system of the conventional example.
Figure 26:
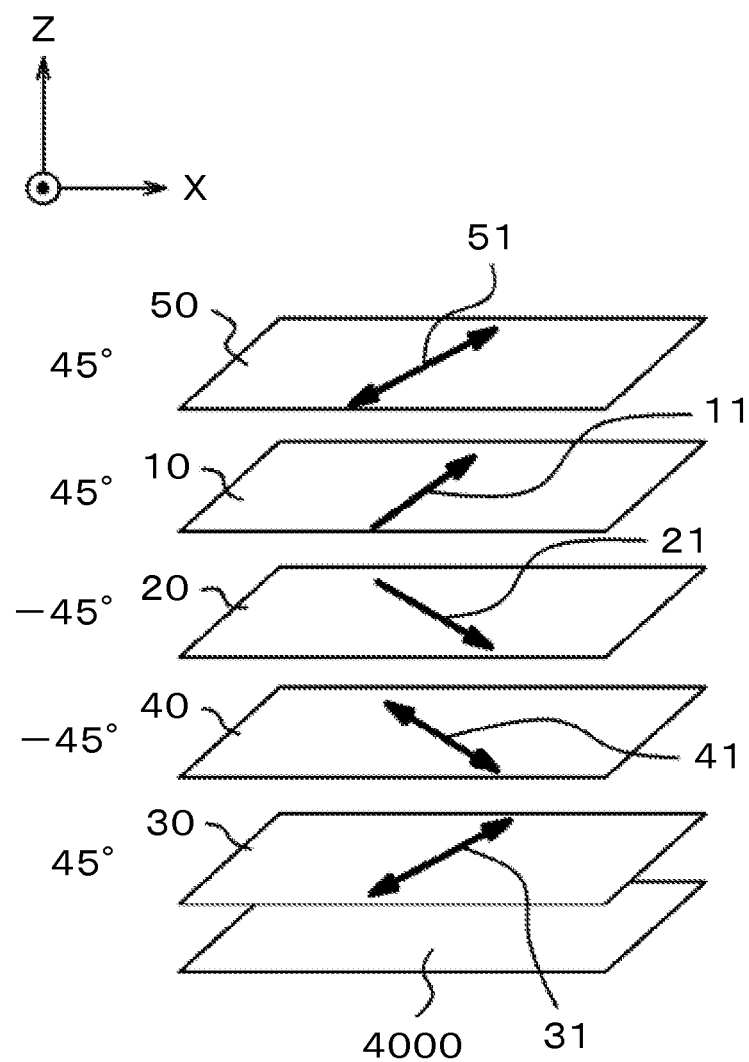
FIG. 26 is a perspective view showing a relationship between an alignment axis of a liquid crystal and a transmission axis of a polarizer in a three-dimensional display device of a parallax barrier system according to the present invention.
Figure 27:
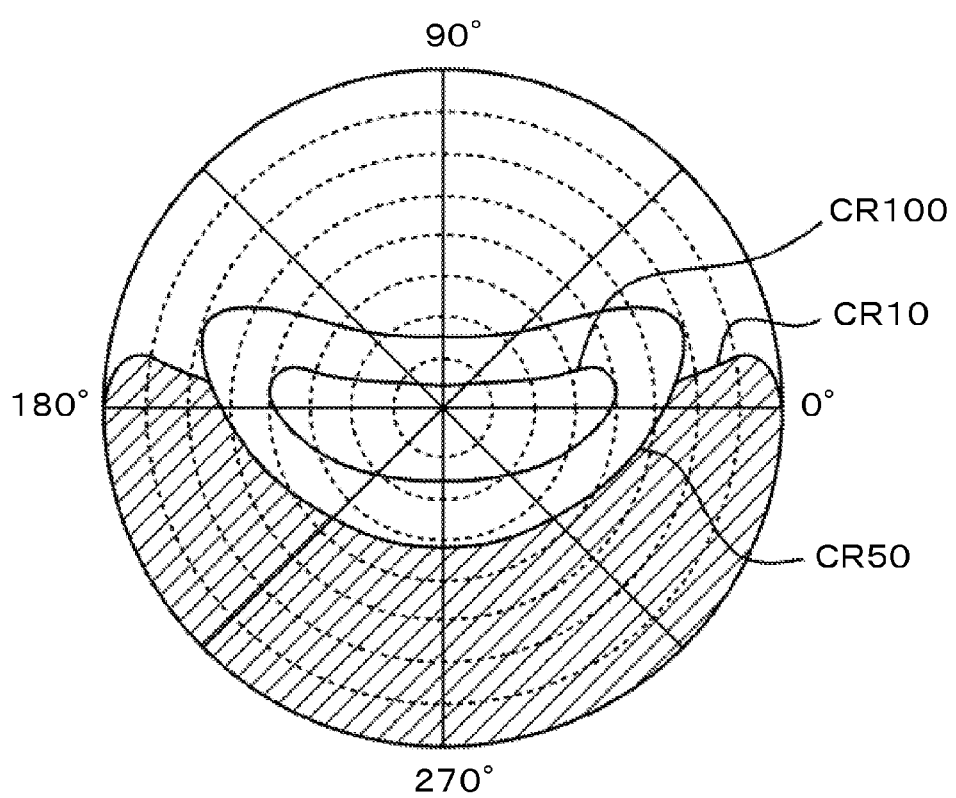
FIG. 27 shows a viewing angle property in the three-dimensional display device of the parallax barrier system according to the present invention.

FIG. 1 is a plane view of a pixel according to a first embodiment of the present invention. In FIG. 1, a pixel is configured by an area surrounded by scanning lines 60 and image signal lines 70. As has been explained in reference to FIG. 22, a total of the pixel area is covered by the common electrode 110. In FIG. 1, positions of a TFT 120 and the through hole 130 are indicated by dotted lines. However, these positions are exemplifications.

A pixel electrode, not illustrated, is configured in a rectangular shape on a lower side of the common electrode 110 via a second interlayer insulator film, not illustrated, within the pixel. A slit 140 is configured at a portion of the common electrode 110 in correspondence with the pixel electrode. The slit 140 includes a bent portion, and a right side slit 1401 and a left side slit 1402 are present by interposing the bent portion.

Figure 2A:
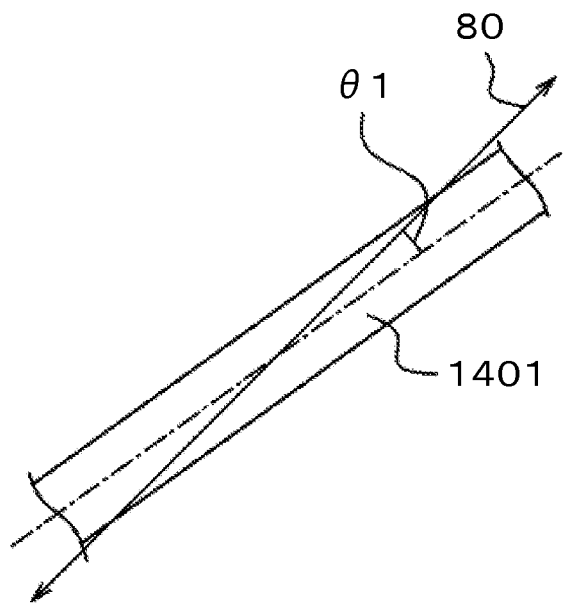
FIGS. 2A and 2B are detailed views showing an inclination direction of a slit of FIG. 1.
Figure 2B:
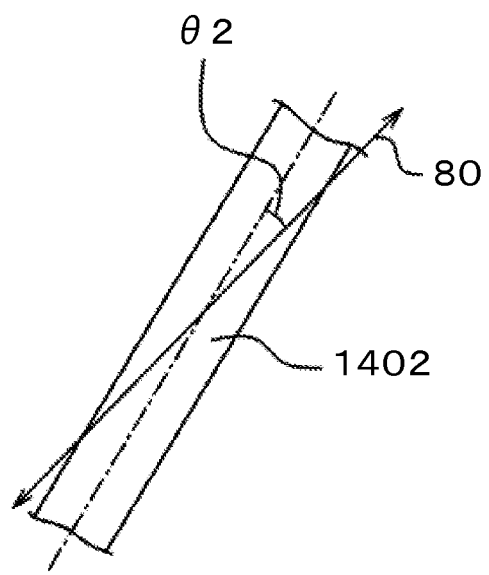

In FIG. 1, an alignment axis of the TFT substrate is in a direction deviated from the x direction by 45 degrees. Incidentally, also an alignment axis of the opposed substrate is in a direction the same as that of the alignment axis of the TFT substrate 100. An angle of intersecting the alignment axis and the right side slit 1401, and an angle of intersecting the alignment axis and the left side slit 1402 are in a symmetric relationship with the alignment axis as a reference. FIGS. 2A and 2B are schematic views showing the state. FIG. 2A shows a relationship between the right side slit 1401 and the alignment axis 80, and the right side slit 1401 and the alignment axis 80 are intersected by an angle of θ1. FIG. 2B shows a relationship between the left side slit 1402 and the alignment axis 80, and the left side slit 1402 and the alignment axis 80 are intersected by an angle of θ2. A relationship of θ1=−θ2 is established.

A direction of the slit 140 and a direction of the alignment axis 80 are made to differ from each other in this way, for aligning rotation directions of liquid crystal molecules in a prescribed area when a voltage is applied between the common electrode 110 and the pixel electrode. That is, in a case of applying a voltage to the pixel electrode, the liquid crystal molecules on left and right sides are rotated in different directions interposing the bent portion of the slit.

A feature of FIG. 1 resides in that in the IPS system, a liquid crystal display panel of the IPS system having a uniform viewing angle can be realized even when the alignment axis 80 is directed from the horizontal direction to the direction of 45 degrees since two pieces of domains having different rotations of liquid crystals are configured in one pixel. Therefore, the alignment axes of the first substrate and the second substrate can be directed in the direction of 45 degrees even in the liquid crystal barrier panel, and therefore, the three-dimensional liquid crystal display panel excellent in the viewing angle property in the horizontal direction can be realized. That is, an area which can make a three-dimensional image visible with inconsiderable crosstalk can be enlarged. Incidentally, although the alignment axis is directed from the horizontal direction to the direction of 45 degrees in the present embodiment and successive embodiments, the present invention includes also a range from 45 degrees to 50 degrees. Further, even when the alignment axis is inclined in a range from 35 degrees to 55 degrees, the effect of the present invention can be achieved.

Second Embodiment

Figure 3:
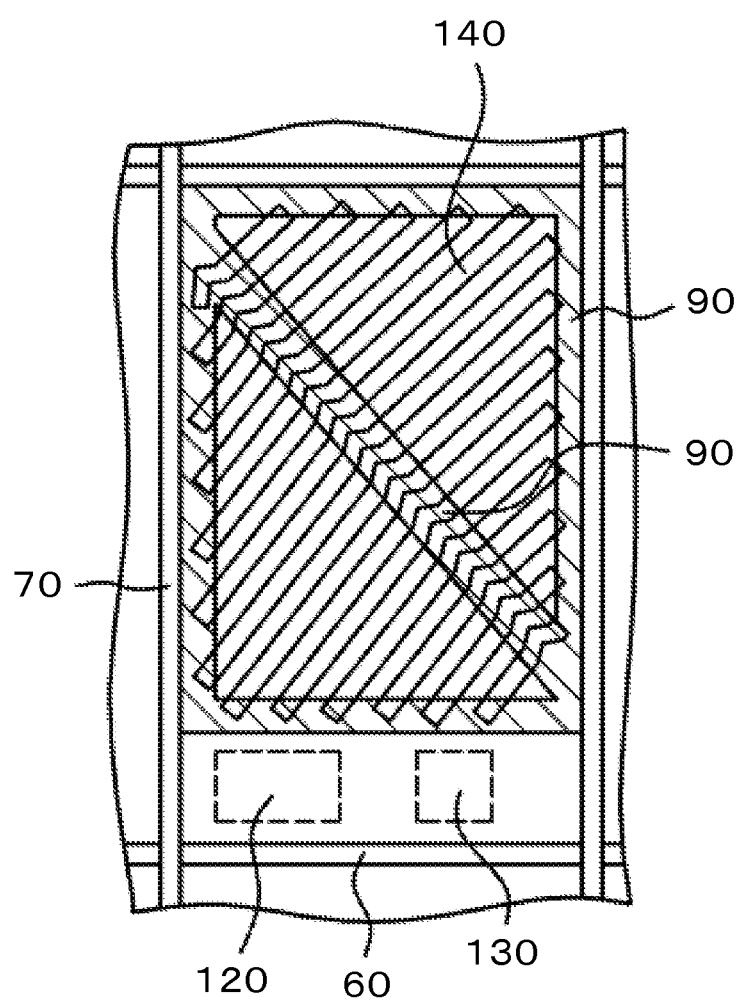
FIG. 3 is a plane view showing a disclination area according to the first embodiment.

According to a pixel structure of the first embodiment, a rotation direction of a liquid crystal molecule is indefinite at the bent portion of the slit 140, a so-called disclination 90 is brought about at the area and the transmissivity of the pixel is reduced. FIG. 3 is a plane view of a pixel showing the behavior. In FIG. 3, the disclinations 90 are brought about at hatched portions. Areas of bringing about the disclinations are an area in a frame-like shape including an end portion of the slit and an area in a stripe-like shape connecting the bent portions. Although in the disclinations, the area in the frame-like shape of the pixel including the end portion of the slit is unavoidable, the area in the stripe-like shape connecting the bent portions is problematic.

The present embodiment enables the alignment axis to direct in a direction of 45 degrees without reducing the transmissivity of the pixel by removing the presence of the bent portion of the pixel as a countermeasure thereagainst. For that purpose, the present embodiment maintains a uniformity of the viewing angle by combining a first pixel A and a second pixel B having different inclinations of slits.

A configuration of making a viewing angle uniform by combining a first pixel and a second pixel is present also in a conventional example. However, in a liquid crystal display device of an IPS system, an alignment axis is directed in a direction which differs from a horizontal direction or a vertical direction by a prescribed angle, and an outer shape of a pixel is obliged to be a shape of a parallelogram having a side inclined to an extending direction of an image signal line in order to improve a space efficiency of a display area. In this case, also the extending direction of the image signal line is inclined for each pixel.

Figure 4:
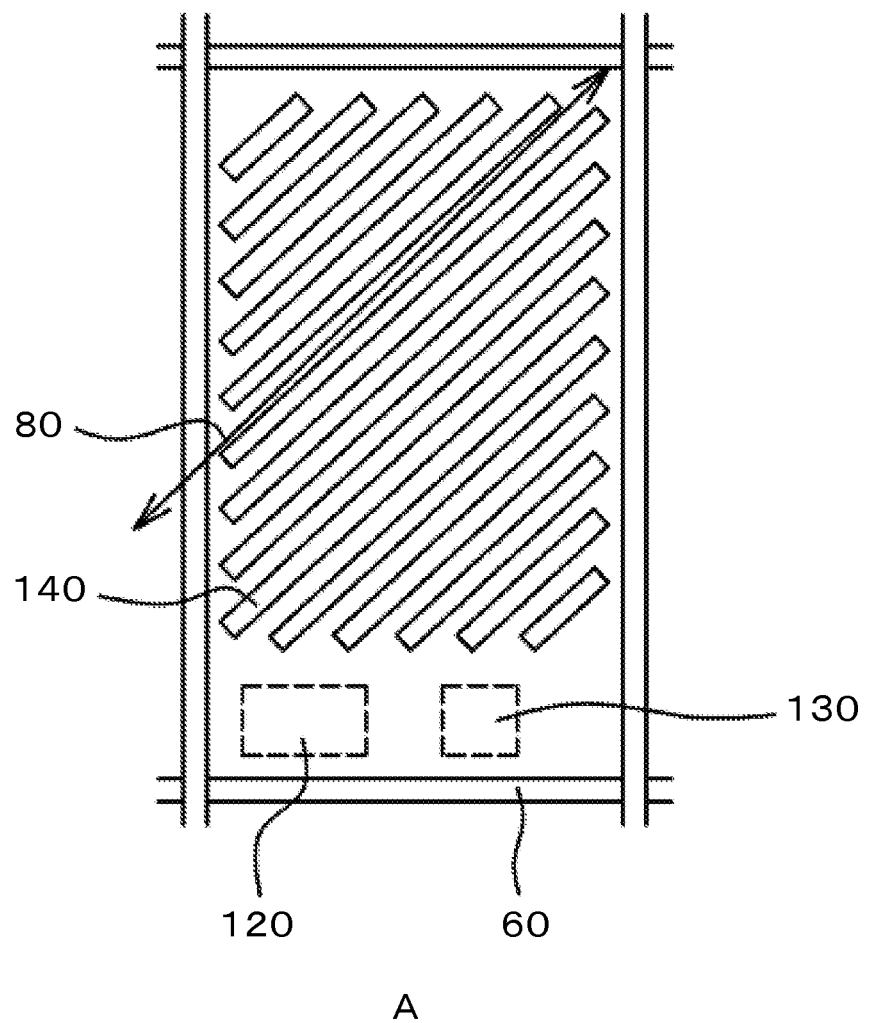
FIG. 4 is a plane view of a pixel A according to a second embodiment.

FIG. 4 is a plane view showing the first pixel A. The pixel is configured at an area surrounded by the scanning lines 60 and the image signal lines 70 similar to FIG. 1. Also, the common electrode 110 covers a total of the pixel similar to FIG. 1. In FIG. 4, all of the slits 140 configured at the common electrode 110 are directed in the same direction, and the bent portion is not present. Therefore, the disclination caused by the bent portion is not present, and therefore, the transmissivity of the pixel is improved by that amount.

Figure 5:
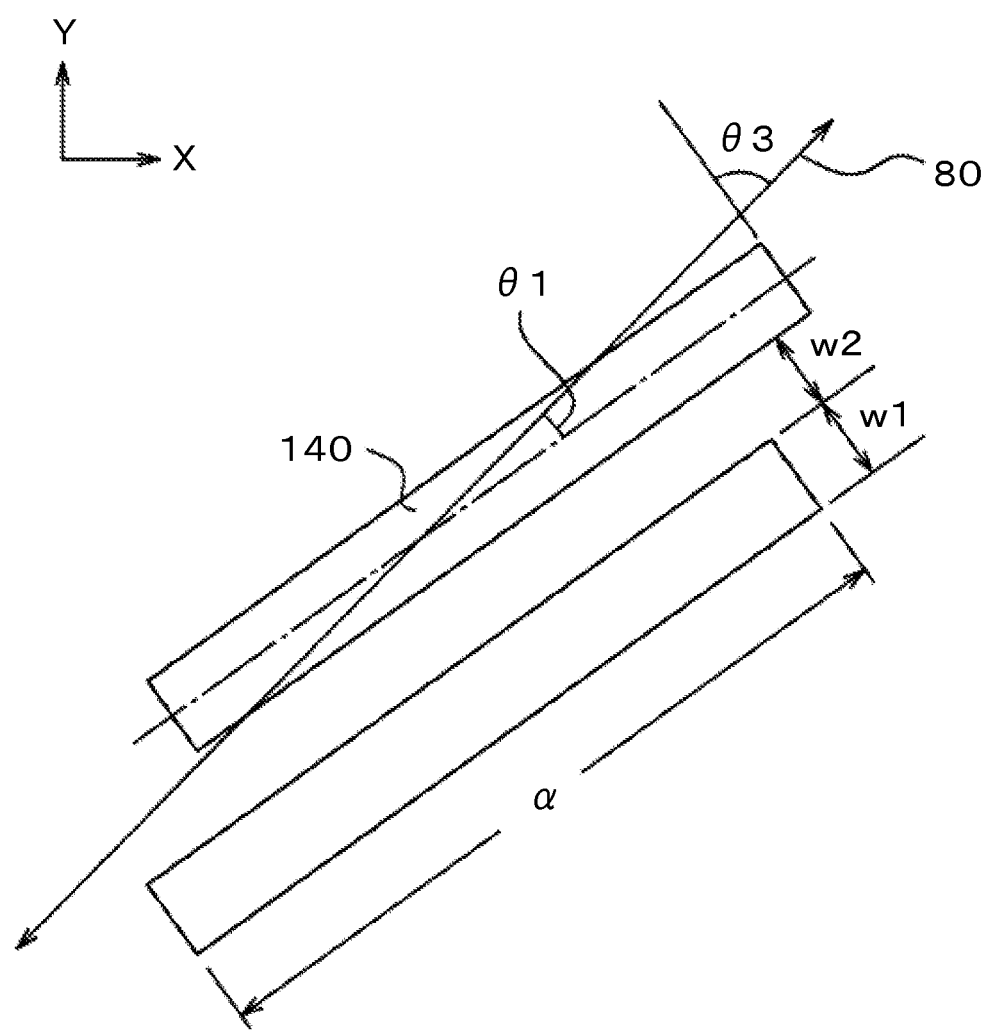
FIG. 5 is a plane view showing details of a slit of FIG. 4.

In FIG. 4, the direction of the alignment axis 80 is directed in a direction deviated from the horizontal direction by 45 degrees. FIG. 5 is a plane view showing a relationship between a long axis direction of the slit 140 and the alignment axis in FIG. 4. In FIG. 5, an angle made by the long axis direction of the slit 140 and the alignment axis 80 is $\theta 1$. All of the slits 140 in the pixel A are directed in the same direction, and therefore, rotation directions of liquid crystal molecules in the pixel A are directed in the same direction. The angle $\theta 1$ is preferably 5 degrees through 15 degrees.

Figure 6:
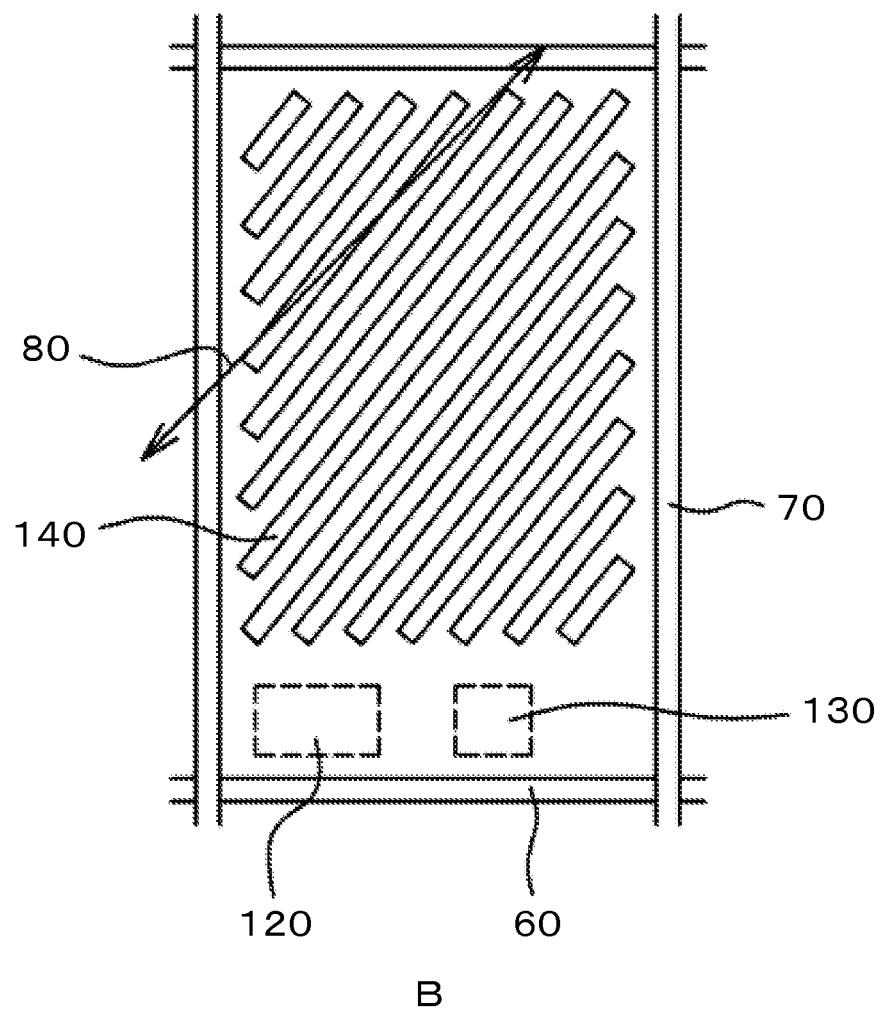
FIG. 6 is a plane view of a pixel B according to the second embodiment.
Figure 7:
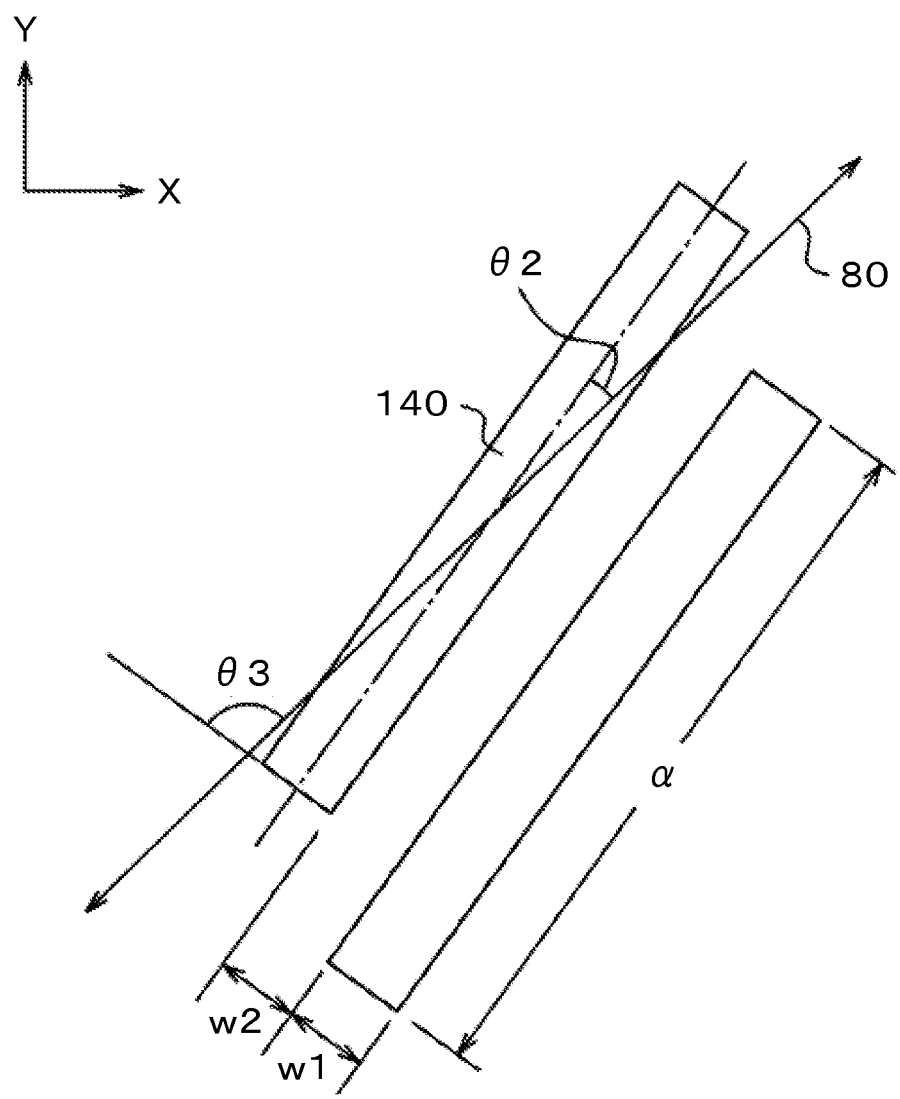
FIG. 7 is a plane view showing details of a slit of FIG. 6.

FIG. 6 is a plane view showing the second pixel B. What FIG. 6 differs from FIG. 4 is an angle made by the long axis direction of the slit 140 of the common electrode 110 and the alignment axis 80. Also in FIG. 6, the direction of the alignment axis 80 is directed in a direction deviated from the horizontal direction by 45 degrees. FIG. 7 shows a plane view showing a relationship between the long axis direction of the slit 140 and the alignment axis 80 in FIG. 6. In FIG. 7, an angle made by the long axis direction of the slit 140 and the alignment axis 80 is $\theta 2$. All of the slits in the pixel B are directed in the same direction, and therefore, rotation directions of liquid crystal molecules in the pixel B are directed in the same direction.

The angle made by the long axis direction of the slit and the alignment axis 80 is $\theta 1$ in FIG. 5, and $\theta 2$ in FIG. 7, and a relationship between $\theta 1$ and $\theta 2$ is $\theta 1=-\theta 2$. Therefore, the rotation directions of the liquid crystal molecules are directed in directions inverse to each other in the pixel A and the pixel B. According to the present invention, an outer shape of the pixel is made to be a rectangular shape or a square shape although the angle made by the long axis direction of the slit and the alignment axis differs between the pixel A and the pixel B. As a result, there is a case where brightness and a pixel capacitance differ between the pixel A and the pixel B. Also, although the viewing angle property differs between the pixel A and the pixel B, in order to reduce the influence, according to the present invention, a uniformity of the viewing angle property is realized while restraining nonuniformity in display by arranging the pixel A and the pixel B by a special arrangement as explained later.

In a case where the brightness differs between the pixel A and the pixel B, the following countermeasure can be carried out.

(1) A length $\alpha$ of the slit 140 is changed. The larger the length $\alpha$ of the slit 140, the more the transmissivity can be improved, and therefore, the length of the slit may be lengthened or shortened in either of the pixel A and the pixel B.

(2) A width w1 of the slit 140 and an interval w2 between the slit 140 and the slit 140 are changed in either of the pixel A and the pixel B. Although an area having the largest transmissivity is disposed at a vicinity of a boundary of the slit 140, the transmissivity more or less differs between the slit 140 and a portion configured with ITO, and therefore, the transmissivity of the pixel can be changed by changing a ratio of the width w1 of the slit 140 to an interval w2 between the slit 140 and the slit 140.

(3) An area in which the rotation direction of the liquid crystal molecule is indefinite is present at a vicinity of a short side portion of the slit 140, and the disclination is brought about at the portion. When a way of causing the disclination differs between the pixel A and the pixel B, a difference in the brightness is brought about between the image A and the image B. Values of an angle θ3 made by the short side of the slit 140 and the alignment axis in FIG. 5 and an angle θ3 made by the short side of the slit 140 and the alignment axis in FIG. 7 differ from each other. θ3 in FIG. 5 is smaller than 90 degrees, and θ3 in FIG. 7 is larger than 90 degrees.

The inventors have discovered that θ3 has a significant influence on the brightness of the pixel. FIG. 8 is a table showing a relationship between θ3 and the brightness in a case where a size of the pixel is 40 μm×30 μm. In FIG. 8, a comparison is made by making a case of θ3 of 82 degrees as 100%.

That is, when the slit 140 is configured by a simple rectangular shape, θ3 differs between the pixel A and the pixel B as shown in FIG. 5 and FIG. 7, and therefore, a difference in the brightness is brought about between the pixel A and the pixel B. The brightness can be made uniform by making θ3 of the pixel A and θ3 of the pixel B uniform. Although in this case, for example, when θ3 is made uniformly to be 90 degrees the brightness is more or less reduced, the pixel can easily be managed.

(4) In a case where the uniformity of the brightness is insufficient even by the countermeasure as described above, a brightness difference between the pixel A and the pixel B can be adjusted by changing an area of an aperture region 3100 of the black matrix 202. FIG. 9A and FIG. 9B show an example of adjusting a brightness of a pixel by the black matrix 202. The brightness in FIG. 9A is naturally larger than that in FIG. 9B.

There is a case where a pixel capacitance differs between the pixel A and the pixel B when an inclination of the slit 140 differs, or for making the brightness uniform between the pixels. In this case, first, the pixel capacitance is adjusted in an area covered with the black matrix 202. In a case where the adjustment is not sufficient only by adjusting the capacitance in the area covered with the black matrix, the pixel capacitance can be adjusted by a shape of the slit 140 in the aperture region 3100 of the black matrix. In this case, the brightness of the pixel is influenced thereby, and therefore, for example, a difference in the brightness between the pixels can be adjusted by changing the area of the aperture portion 3100 of the black matrix 202 shown in (4) described above.

Figures 10, 11:
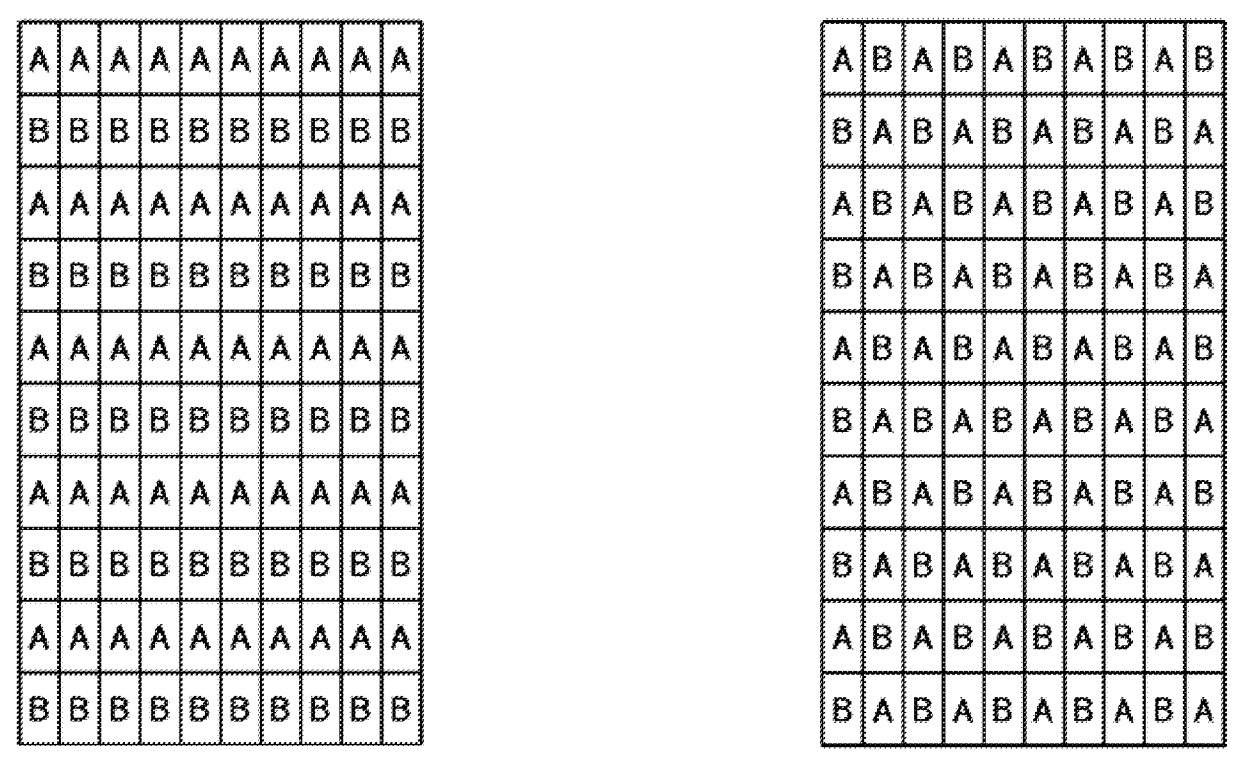

The viewing angle property differs between the pixel A and the pixel B. It is important to arrange the pixels for making the viewing angle property uniform over a total of a screen. FIG. 10 shows a pixel arrangement for making the viewing angle uniform by two pixels of the conventional example. According to the conventional example, in a method of making the viewing angle uniform by changing the direction of the inclination of the pixel electrode or the common electrode by the first pixel and the second pixel, it is necessary to configure a parallelogram inclined in a vertical direction of the pixel. A vertical axis of the parallelogram in this case is inclined to the y axis direction of the screen. Therefore, according to the conventional example, at the first pixels A and the second pixels B, the same pixels are obliged to be arranged for each row as shown in FIG. 10. However, according to the arrangement of FIG. 10, a stripe-like nonuniformity of the screen is liable to be brought about.

FIG. 11 shows a first arrangement example according to the present invention. FIG. 11 shows an example of arranging the pixels A and the pixels B in a checkered shape for respective single pixels. This arrangement can be said to be an arrangement in which the nonuniformity is difficult to be conspicuous the most.

Figures 12, 13:
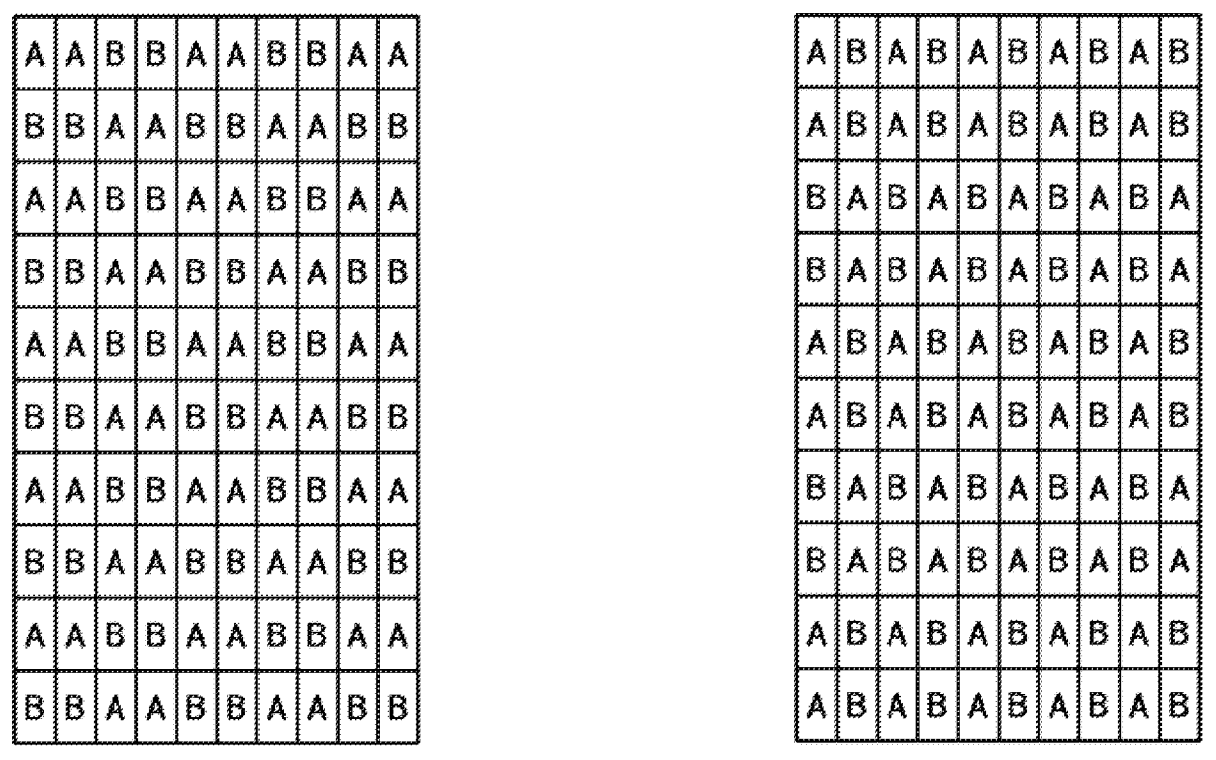

FIG. 12 shows a second arrangement example of the present invention and an example of arranging the pixels A and the pixels B respectively aligned in two pieces in the transverse direction as units in a checkered shape. FIG. 13 shows a third arrangement example of the present invention and is an example of arranging the pixels A and the pixels B aligned in two pieces in the vertical direction as units in a checkered shape.

Figures 14, 15:
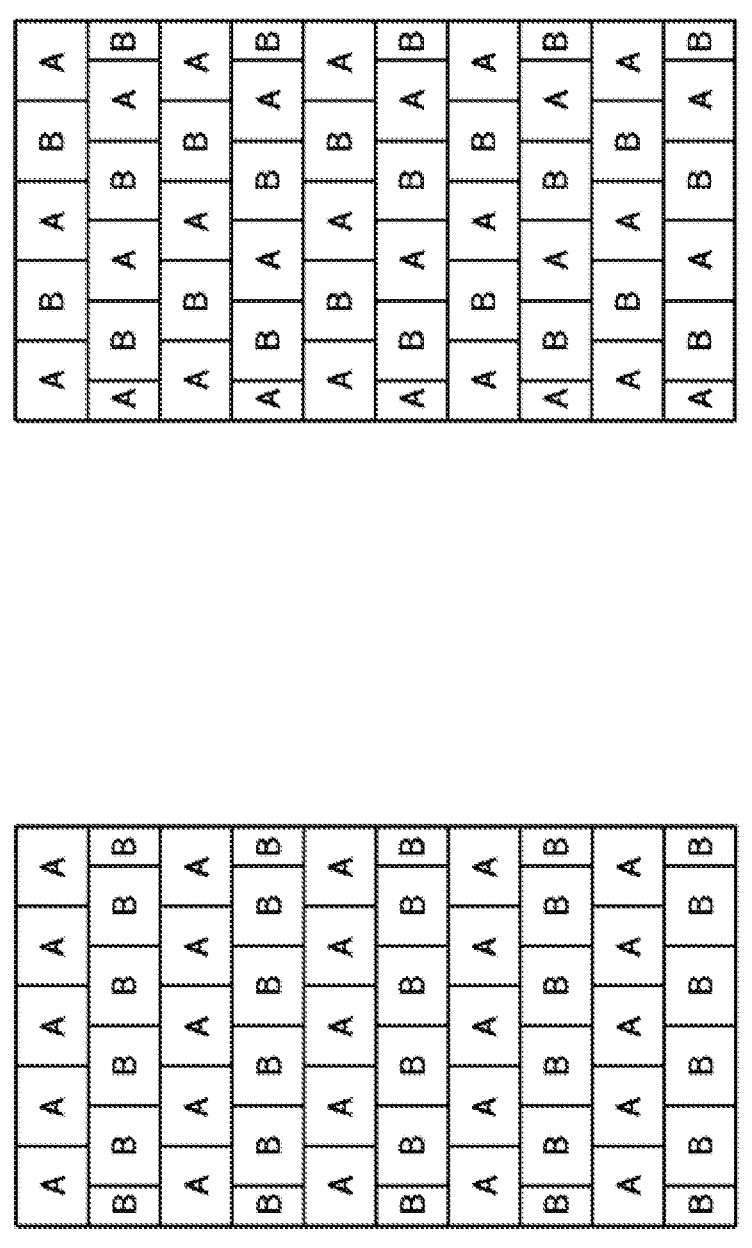

FIG. 14 shows a pixel arrangement and an example of arranging pixels in a delta arrangement for making the viewing angle uniform by two pixels in the conventional example. Also in this case, in the conventional example, the outer shape of the pixel is obliged to be a parallelogram in which the vertical axis is inclined from the y axis direction of the screen, and therefore, as shown in FIG. 14, the same pixels are obliged to be arranged at the same row. Therefore, the stripe-like nonuniformity of the screen is liable to be brought about in the conventional example.

In contrast thereto, according to the present invention, the outer shape of the pixel can be made to be a rectangular shape or a square shape, and therefore, an arrangement which is more difficult to bring about the nonuniformity of the screen can be configured. FIG. 15 shows a fourth arrangement example of the present invention and is an arrangement in which in a case where a direction of extending a scanning line is made to be a first direction, and a direction of extending an image signal line is made to be a second direction, the pixel A and the pixel B are alternately arranged in the first direction, and the pixel A of a first line and the pixel A of a second line are shifted from each other in the first direction by a half pixel.

Figures 16, 17:
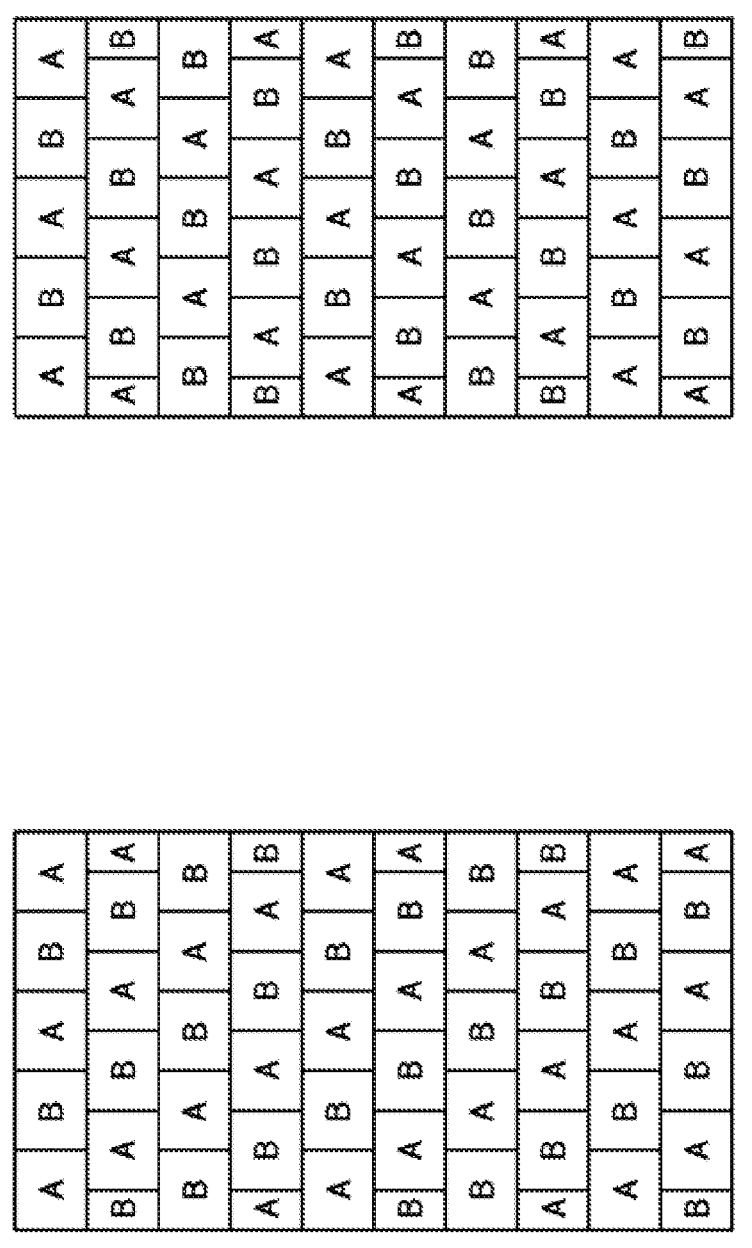

FIG. 16 shows a pixel arrangement example of the present invention and is an arrangement in which in a case where a direction of extending a scanning line is made to be an x direction, and a direction of extending an image signal line is made to be a y direction, the pixel A and the pixel B are arranged alternately in the x direction, the pixel A of a second row is shifted from the pixel A of a first row in a +x direction by a half pixel, and the pixel A in a third row is shifted from the pixel A of the second row in the +x direction by a half pixel.

FIG. 17 shows a sixth arrangement example of the present invention and is an arrangement in which in a case where a direction of extending a scanning line is made to be an x direction, and a direction of extending an image signal line is made to be a y direction, the pixel A and the pixel B are alternately arranged in an x direction, the pixel A of a second row is shifted from the pixel A of a first row in a −x direction by a half pixel, and the pixel A of a third row is shifted from the pixel A of the second row in the −x direction by a half pixel.

As shown in FIGS. 11 through 13 and FIGS. 15 through 17, according to a pixel structure of the present invention, a pixel arrangement of reducing the nonuniformity in the screen can be configured.

Third Embodiment

Figure 18:
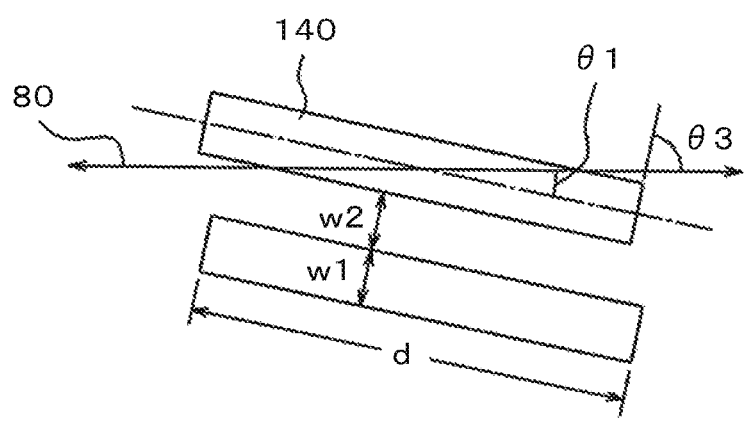
FIG. 18 is a detailed plane view of a slit of a pixel A according to a third embodiment.
Figure 19:
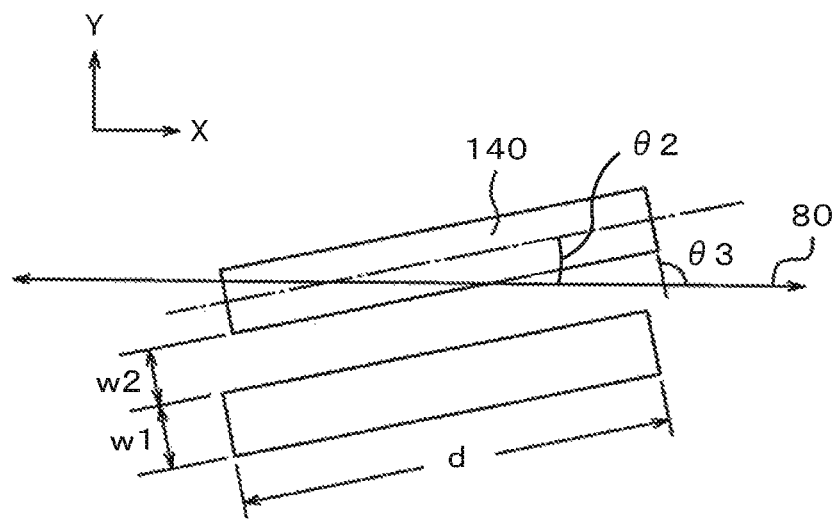
FIG. 19 shows a detailed plane view of a slit of a pixel B according to the third embodiment.
Figure 20:
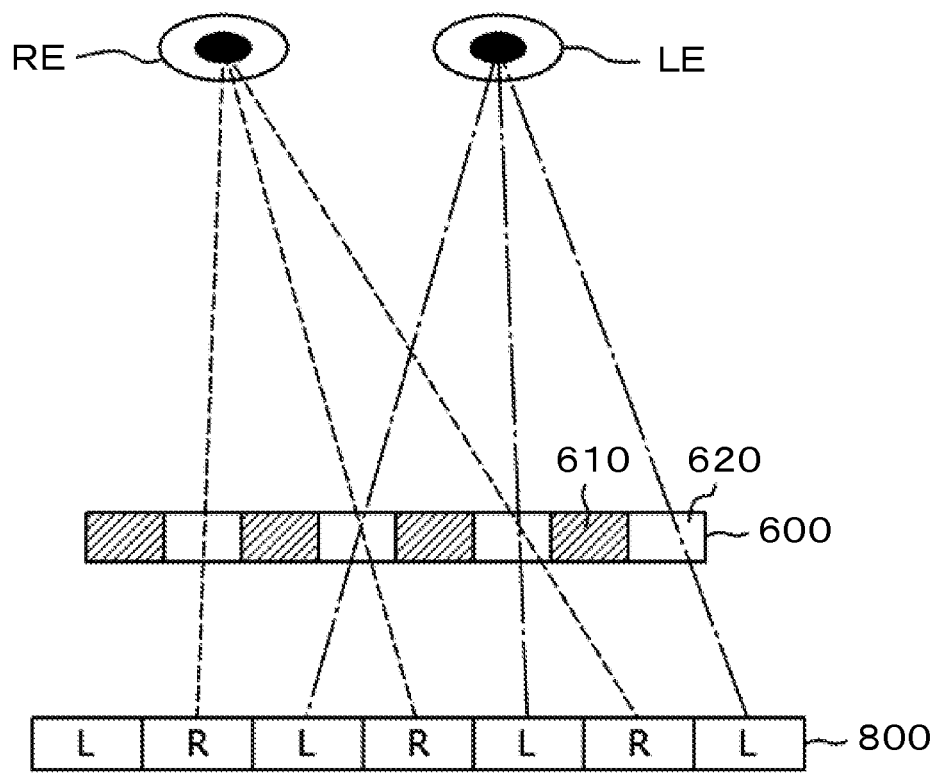
FIG. 20 is a schematic view showing a principle of a three-dimensional display device of a parallax barrier system.
Figure 21:
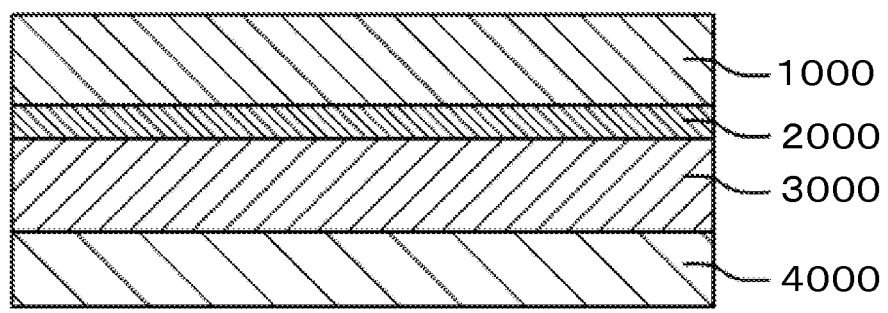
FIG. 21 is an outline sectional view of a three-dimensional display device of the parallax barrier system.

Means for countermeasure against a nonuniformity in a screen by the presence of two different pixels by using the two pixels having different directions of long axis directions of the slit 140 while making the viewing angle uniform is not limited that in a case where an angle of an alignment axis of a liquid crystal display panel of an IPS system is 45 degrees. FIG. 18 and FIG. 19 show examples of cases where the direction of the alignment axis 80 of the slit 140 of the pixel is a horizontal direction. FIG. 18 shows an example of a case where the direction of the long axis of the slit 140 of the pixel is inclined in the clockwise direction relative to the horizontal direction by θ1, and FIG. 19 shows an example of a case where the direction of the long axis of the slit of the pixel is inclined in the anticlockwise direction relative to the horizontal direction by θ2. A relationship of θ1=−θ2 is established, and a preferable angle of θ1 falls in a range of 5 degrees through 15 degrees.

In a case where a pixel having the slit 140 shown in FIG. 18 is defined as a pixel A, and a pixel having the slit 140 shown in FIG. 19 is defined as a pixel B, outer shapes of both of the pixel A and the pixel B are rectangular shapes or square shapes. In this case, brightness or a pixel capacitance differs between the pixel A and the pixel B similar to those explained in the second embodiment. In a case where the brightness differs between the pixel A and the pixel B, as shown in the second embodiment, the following means can be adopted. (1) The length d of the slit 140 is adjusted between the pixels. (2) A ratio of the width w1 of the slit 140 to the interval w2 is adjusted between the pixels. (3) The angle θ3 made by the short axis direction of the slit 140 and the alignment axis direction 80 is equalized between the two pixels. Preferably, θ3 is made to be 90 degrees for both pixels. (4) The aperture area of the black matrix is adjusted between the pixels.

Further, in a case where the pixel capacitance differs between the two pixels, first, in the pixels, the pixel capacitance is made to be uniform between the two pixels by adjusting an electrode in an area covered with the black matrix. In a case where the pixel capacitance is not made to be uniform sufficiently only by the area, a shape of the slit 140 in the transmission area of the pixel is adjusted. In this case, in a case where the brightness differs between the two pixels, the brightness can be made to be uniform by adjusting the aperture area of the black matrix between the two pixels.

The pixel A and the pixel B in this case are configured by a rectangular shape or a square shape, and therefore, the arrangements as shown in FIG. 11 through FIG. 13 or FIG. 15 through FIG. 17 as explained in the second embodiment can be adopted. Therefore, the nonuniformity in the screen can be restrained even in the case of using the two different pixels.

Although FIG. 18 and FIG. 19 show the cases where the direction of the alignment axis is directed in the horizontal direction, that is, the x axis direction, even in a case where the direction of the alignment axis is directed in the y axis direction, a brightness difference and a difference of the pixel capacitance between the pixels can be restrained and the viewing angle can be made to be made uniform while restraining the nonuniformity in the screen by adopting the means explained above.

What is claimed is:

1. A three-dimensional display device which is a three-dimensional display device of a parallax barrier system including a liquid crystal display device of an IPS system having a TFT substrate and an opposed substrate as well as a liquid crystal barrier panel of a TN system having a first substrate and a second substrate;
   wherein the opposed substrate of the liquid crystal display device and the second substrate of the liquid crystal barrier panel are opposedly arranged by interposing a polarizer;
   wherein the liquid crystal display device is a liquid crystal display device interposing a liquid crystal between the TFT substrate having a pixel configured by a common electrode having a slit above a pixel electrode configured in a planar shape and the opposed substrate having a black matrix;
   wherein the pixel is configured by a rectangular shape or a square shape, and configured between a scanning line extended in a first direction and aligned in a second direction and an image signal line extended in the second direction and aligned in the first direction;
   wherein the TFT substrate includes a first pixel in which an angle made by an alignment axis of the TFT substrate and a direction of a long axis of a slit of the first pixel is θ1 and a second pixel in which an angle made by the alignment axis of the TFT substrate and a direction of a long axis of a slit of the second pixel is θ2;
   wherein the θ1 and the θ2 are in a relationship of θ1=−θ2;
   wherein the first pixel and the second pixel are arranged to switch in the first direction, and arranged to switch in the second direction; and
   wherein the alignment axis of the TFT substrate and an alignment axis of the second substrate of the liquid crystal barrier panel coincide with each other or are orthogonal to each other.

2. The three-dimensional display device according to claim 1, wherein the alignment axis of the TFT substrate is deviated from a direction of the scanning line by 45 degrees.

3. The three-dimensional display device according to claim 1, wherein a length of the slit of the first pixel differs from a length of the slit of the second pixel.

4. The three-dimensional display device according to claim 1, wherein a width of the slit of the first pixel differs from a width of the slit of the second pixel.

5. The three-dimensional display device according to claim 1, wherein an angle made by a direction of a short side of the slit of the first pixel and the alignment axis is equal to an angle made by a direction of a short side of the slit of the second pixel and the alignment axis.

6. The three-dimensional display device according to claim 1, wherein an aperture area of the black matrix of the opposed substrate in correspondence with the first pixel differs from an aperture area of the black matrix of the opposed substrate in correspondence with the second pixel.

7. A three-dimensional display device which is a three-dimensional display device of a parallax barrier system including a liquid crystal display device of an IPS system having a TFT substrate and an opposed substrate as well as a liquid crystal barrier panel of a TN system having a first substrate and a second substrate;
   wherein the opposed substrate of the liquid crystal display device and the second substrate of the liquid crystal barrier panel are opposedly arranged by interposing a polarizer;
   wherein the liquid crystal display device is a liquid crystal display device interposing a liquid crystal between the TFT substrate including a pixel configured by a common electrode having a slit above a pixel electrode configured in a planar shape and the opposed substrate having a black matrix;
   wherein the pixel is configured by a rectangular shape or a square shape, and configured between a scanning line extended in a first direction and aligned in a second direction and an image signal line extended in the second direction and aligned in the first direction;
   wherein the TFT substrate includes a first pixel in which an angle made by an alignment axis of the TFT substrate and a direction of a long axis of a slit of the first pixel is θ1 and a second pixel in which an angle made by the alignment axis of the TFT substrate and a direction of a long axis of a slit of the second pixel is θ2;

wherein the θ1 and the θ2 are in a relationship of θ1=−θ2;

wherein the first pixel and the second pixel are arranged to switch in the first direction in a first row, and arranged to switch in the first direction in a second row, and the first pixel in the first row and the second pixel in the second row are arranged to shift in the first direction by a half of a diameter of the first pixel in the first direction; and wherein the alignment axis of the TFT substrate and an alignment axis of the second substrate of the liquid crystal barrier panel coincide with each other.

8. The three-dimensional display device according to claim 7, wherein the alignment axis of the TFT substrate is deviated from a direction of the scanning line by 45 degrees.

9. The three-dimensional display device according to claim 7, wherein a length of the slit of the first pixel differs from a length of the slit of the second pixel.

10. The three-dimensional display device according to claim 7, wherein a width of the slit of the first pixel differs from a width of the slit of the second pixel.

11. The three-dimensional display device according to claim 7, wherein an angle made by a direction of a short side of the slit of the first pixel and the alignment axis is equal to an angle made by a direction of a short side of the slit of the second pixel and the alignment axis.

12. The three-dimensional display device according to claim 7, wherein an aperture area of the black matrix of the opposed substrate in correspondence with the first pixel differs from an aperture area of the black matrix of the opposed substrate in correspondence with the second pixel.

* * * * *